(12) United States Patent
Nakamura

(10) Patent No.: US 8,167,352 B2
(45) Date of Patent: May 1, 2012

(54) FLOOR CARPET FOR VEHICLE

(75) Inventor: Mitsuyoshi Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 12/309,710

(22) PCT Filed: Aug. 28, 2008

(86) PCT No.: PCT/JP2008/065915
§ 371 (c)(1),
(2), (4) Date: Jan. 19, 2010

(87) PCT Pub. No.: WO2009/041238
PCT Pub. Date: Apr. 2, 2009

(65) Prior Publication Data
US 2010/0237642 A1   Sep. 23, 2010

(30) Foreign Application Priority Data
Sep. 25, 2007   (JP) ................................ 2007-247143

(51) Int. Cl.
*B62D 25/20*   (2006.01)
(52) U.S. Cl. ...................... 296/97.23; 224/542; 160/404
(58) Field of Classification Search ................ 296/97.23; 160/404; 229/125.19, 125.36, 125.32; 224/542
See application file for complete search history.

(56) References Cited

U.S. PATENT DOCUMENTS 2,788,932 A * 4/1957 German, Jr. ............. 229/125.31
4,801,169 A * 1/1989 Queen et al. ................. 296/39.1

FOREIGN PATENT DOCUMENTS

| GB | 497249 | 12/1938 |
| JP | 57-019309 Y2 | 4/1982 |
| JP | S62-130961 | 8/1987 |
| JP | 03-045345 Y1 | 4/1991 |
| JP | 07-257291 | 10/1995 |
| JP | 2005-186874 | 7/2005 |

* cited by examiner

*Primary Examiner* — Dennis Pedder
(74) *Attorney, Agent, or Firm* — Carrier Blackman and Associates, P.C.; Joseph P. Carrier; William D. Blackman

(57) ABSTRACT

A floor carpet (40) for covering a vehicle floor as well as a tool storage area is disclosed. The floor carpet has an overlapping flap (57) for overlapping a rear surface (33) of a peripheral edge of an opening (32) formed in a vehicle body (11) when the opening is closed, the flap being able to be pulled toward the surface of the opening when opened. The overlapping flap has a plurality of small lap portions (61) and a plurality of large lap portions (62) for overlapping the rear surface of the peripheral edge of the opening to a small degree and a large degree. The small lap portions and the large lap portions are alternately arranged in a wave shape.

5 Claims, 5 Drawing Sheets

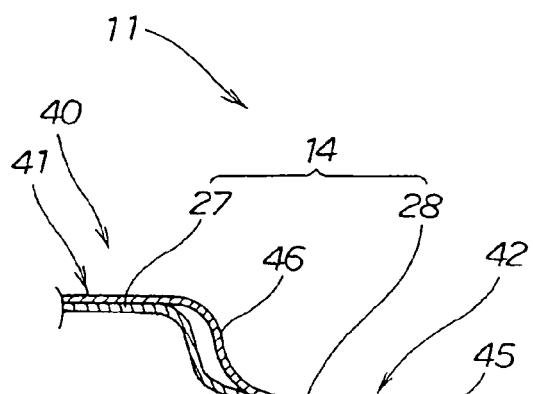
FIG.2
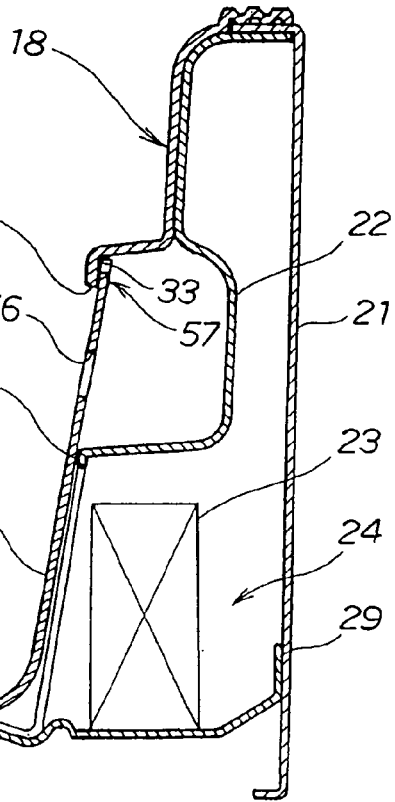
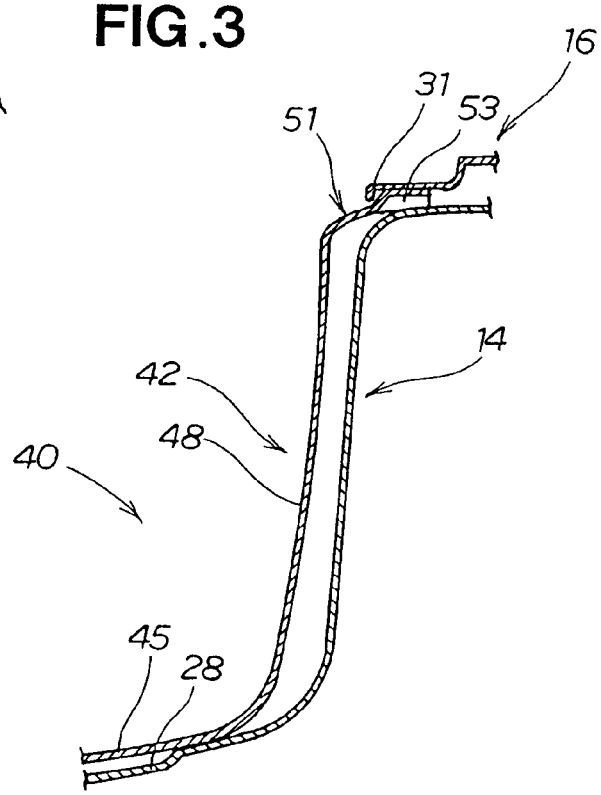
FIG.3

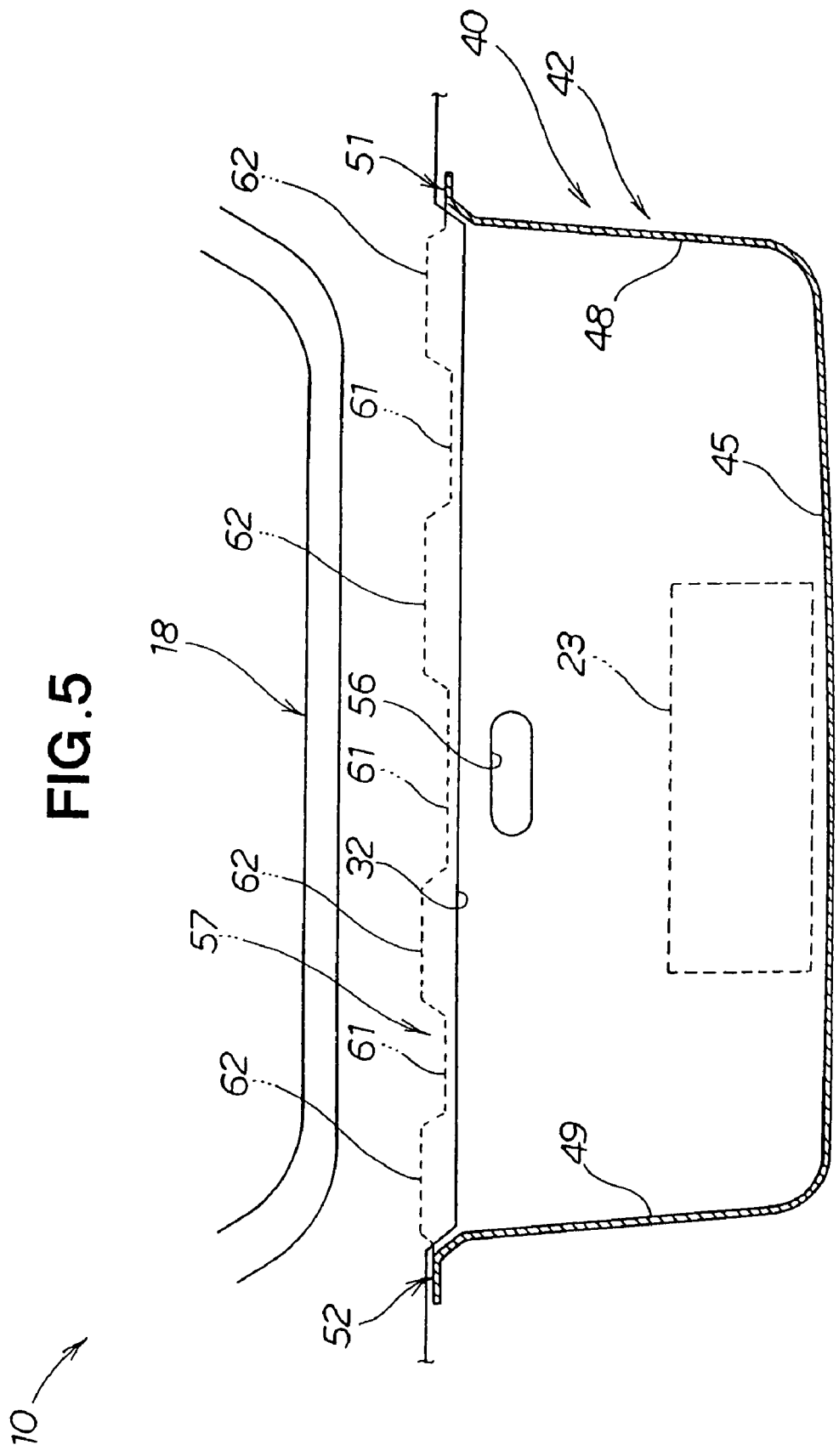

FLOOR CARPET FOR VEHICLE

TECHNICAL FIELD

The present invention relates to a floor carpet for covering a vehicle floor and a tool storage area and the like at the same time.

BACKGROUND ART

Among vehicle floor carpets are known carpets that cover a storage area in which a spare tire is stored, and cover a storage portion in which tools are stored.

A vehicle floor carpet that covers a floor of a vehicle and simultaneously covers suitably necessary areas is known, as disclosed in Japanese Utility Model Application Laid-Open Publication No. 62-130961.

An interior material disclosed in Japanese Utility Model Application Laid-Open Publication No. 62-130961 has end portions of the interior material tucked into structural members of the vehicle body to support the end portions of the interior material, an openable and closeable lid is formed by forming substantially U-shaped notches on the end portion of the interior material, and reinforcing members are provided to prevent the lid from collapsing to the vehicle body side of the lid.

For example, the floor carpet lying on the vehicle floor protrudes in the height direction, and the end portions of the floor carpet are tucked into structural members of the vehicle body to support the end portions of the floor carpet to provide the same structure as that of the mode of the interior material described above.

In a conventional interior material, the collapse of an openable and closeable lid formed in the interior material is prevented by forming substantially U-shaped notches in the end portion of the interior material. However, it is necessary to provide a reinforcing member to prevent the lid from collapsing toward the vehicle body, and this leads to an increase in the number of parts.

With the interior material, the lid can be prevented from collapsing toward the vehicle body, but it is believed that inadequate self-support properties (instability) could result when the lid is closed. In other words, using the same structure as the mode of the interior material described above will lead to an increase in part numbers and it is believed that inadequate self-support properties (instability) will result when the lid is closed.

DISCLOSURE OF THE INVENTION

An object of the present invention is to provide a technique in which the tool storage area and the like are openably and closeably covered by a floor carpet, whereby the floor carpet can maintain a stable closed state when closed while the floor carpet can be pulled out with greater ease when open.

Another object of the present invention is to provide a vehicle floor carpet in which an increase in the number of parts can be avoided when the floor carpet openably and closeably covers a tool storage area and the like.

According to an aspect of the present invention, there is provided a vehicle floor carpet having an overlapping flap for overlapping a rear surface of a peripheral edge of an opening formed in a vehicle body when the opening is closed, the flap being capable of being pulled toward a front surface of the opening when the opening is opened, wherein the overlapping flap comprises: a plurality of small lap portions having a small surface area for overlapping the rear surface of the peripheral edge of the opening; and a plurality of large lap portions having a large surface area for overlapping the rear surface of the peripheral edge of the opening.

With this arrangement, the pull-out properties of the floor carpet of the present invention when the floor carpet is open (when pulled out) can be enhanced, and a stable closed state can be maintained when the floor carpet is closed. The overlapping flap merely overlaps the rear surface of a peripheral edge of the opening. Therefore, e.g., a tool storage area and the like can be openably and closeably covered by the floor carpet while avoiding an increase in the number of parts.

Preferably, the small lap portions and the large lap portions are alternately arranged so as to form a wave shape. Therefore, the operating load applied when the overlapping flap is pulled out (opened) is reduced, and the overlapping flap can therefore be more easily returned to the stored (closed) position. Moreover, the operating load applied during pulling can be made uniform.

Desirably, the floor carpet is provided with a handle for pulling out the carpet toward an interior of a passenger compartment, and the small lap portions are provided above the handle. Thus, engagement of the small lap portion with the rear surface of the peripheral edge of the opening is reduced and the initial load applied when the floor carpet is pulled out can also be reduced. As a result, the pull-out properties of the floor carpet can be improved.

In a preferred form, the large lap portions are provided at opposite ends of the overlapping flap. Thus, engagement with the rear surface of the peripheral edge of the opening is increased, and the floor carpet can therefore be better supported (made more stable) when closed.

It is preferable that convexities for engaging the vehicle body be provided to the left and right flanges in an area adjacent two ends of the overlapping flap. For example, the floor carpet becomes difficult to return to the closed position when disengaged to an area adjacent to the two ends of the overlapping flap of the floor carpet. In other words, when the convexities for engaging the vehicle body are provided in an area adjacent to the two ends of the overlapping flap, disengagement from the area adjacent to the two ends of the floor carpet can be prevented. As a result, the floor carpet can be opened and closed with greater ease.

BRIEF DESCRIPTION OF THE DRAWINGS

FIG. 2 is an enlarged cross-sectional view taken along line 2-2 of FIG. 1;

FIG. 3 is an enlarged cross-sectional view taken along line 3-3 of FIG. 1;

FIG. 5 is a cross-sectional view taken along line 5-5 of FIG. 1; and

BEST MODE FOR CARRYING OUT THE INVENTION

Figure 1:
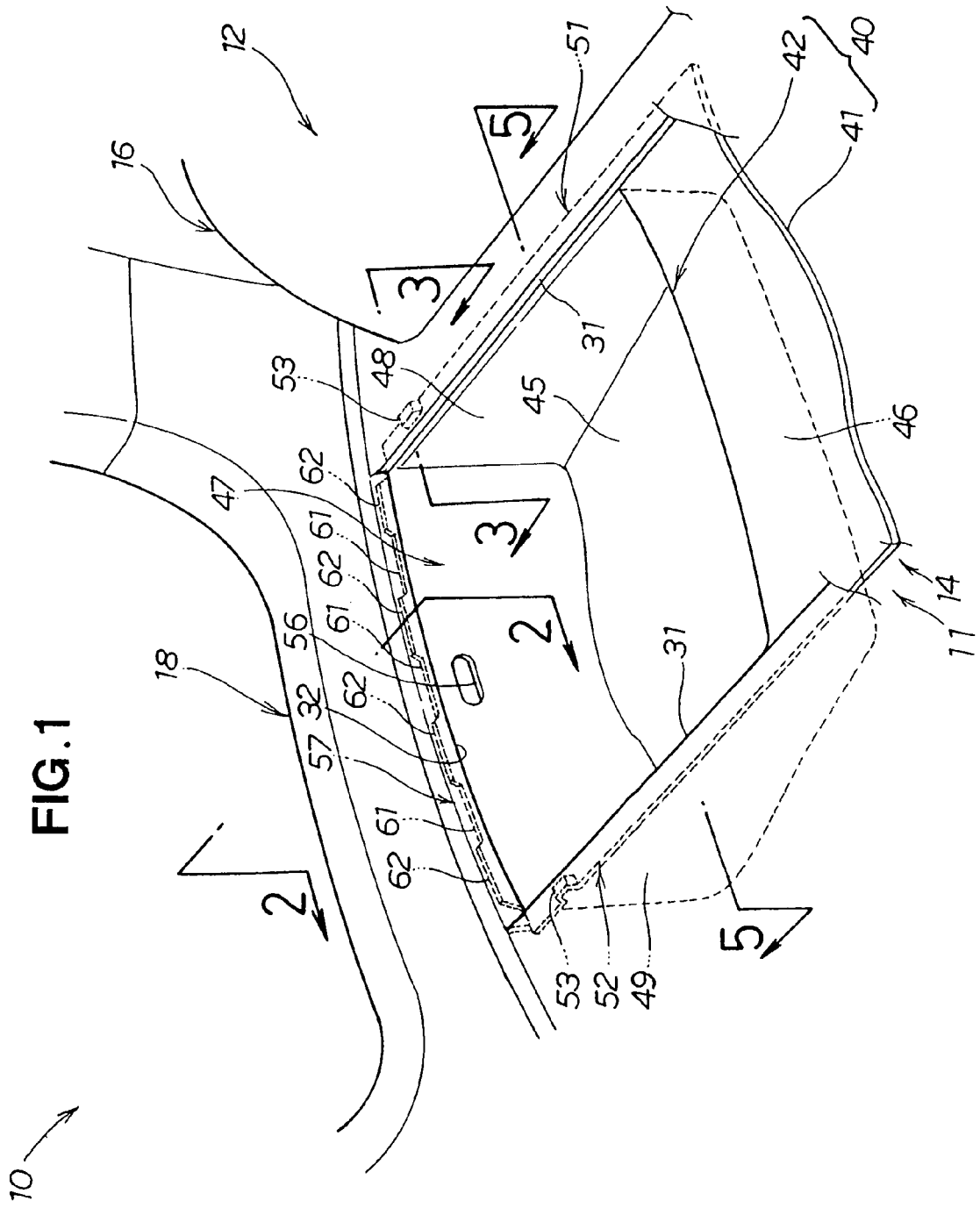
FIG. 1 is a perspective view showing a rear trunk of a vehicle in which the vehicle floor carpet according to the present invention is used.

The rear trunk compartment 10 of a vehicle is composed of a vehicle body floor 14 constituting a lower portion of a vehicle body 11, a floor carpet 40 spread over the top of the vehicle body floor 14, left and right wheelhouse linings 16, 16 (one of the reference numerals 16 is not depicted) for covering a passenger compartment 12 side of the left and right rear wheelhouses (not depicted), a tailgate frame 17 for openably and closeably supporting a tailgate (not depicted), and a tailgate lower lining 18 for covering the inside lower portion of the passenger compartment 12 of the tailgate frame body 17, as shown in FIGS. 1 through 3.

The tailgate frame body 17 is composed of an outer panel 21 constituting the outer surface of the vehicle body 11, and an inner panel 22 that is mounted on the outer panel 21 and that supplements the rigidity of the outer panel 21. The tailgate frame body 17 also has a tool storage area 24 for storing vehicle tools 23 between the outer panel 21 and the inner panel 22, and a support part 25 that is formed in the inner panel 22 and supports the back end wall section (open and close section) 47 of the floor carpet 40.

The vehicle floor 14 has a flatly formed flat area 27 and a concavity 28 that is downwardly concave toward the vehicle body 11, as shown in FIG. 2. The rear part 29 of the vehicle body floor is connected to the inner panel 22 and the outer panel 21 of the tailgate frame body 17.

A wheelhouse lining 16 has a flange retention section 31 that retains left and right flanges 51, 52 of the floor carpet 40.

The tailgate lower lining 18 has a back end retention section 32 that retains a back end wall section 47 of the floor carpet 40, as shown in FIG. 2. The back end retention section 32 is an opening of the tool storage area 24 provided to the vehicle body 11.

The floor carpet 40 has a carpet area 41 laid out over the flat area 27 of the vehicle body floor 14, and a storage concavity 42 that is laid out over the concavity 28 of the vehicle body floor 14 and that allows objects to be stored.

The storage concavity 42 is composed of a bottom surface section 45 that forms a bottom; an anterior end wall section 46 in which a front section of the bottom surface section 45 is upwardly erect; a back end wall section 47 in which a posterior section of the bottom surface section 45 is upwardly erect; left and right side wall sections 48, 49 in which the left and right sides of the bottom surface section 45 are upwardly erect; left and right flanges 51, 52 formed on the opening ends of the left and right side wall sections 48, 49; and convexities 53, 53 that are formed in the left and right flanges 51, 52 in an area adjacent to the two ends of a later-described overlapping flap 57 and that increase the force with which the flanges are retained (supported) by the wheelhouse linings 16, 16.

The back end wall section 47 has a handle 56 for pulling forward (toward the front of the vehicle body) the back end wall section 47, and the overlapping flap 57 for overlapping a rear surface 33 of a peripheral edge of the back end retention section 32.

The overlapping flap 57 is a portion for overlapping the rear surface 33 of the peripheral edge of an opening 32 when the back end retention section (opening) 32 formed in the vehicle body 11 (see FIG. 1) is closed. The portion can be pulled to the surface side (forward) of the opening 32 when opened. The overlapping flap has a plurality of small lap portions 61 having a small surface area for overlapping the rear surface 33 of the peripheral edge of the opening 32, and a plurality of large lap portions 62 having a large surface area for overlapping the rear surface 33 of the peripheral edge of the opening 32.

The overlapping flap 57 has small lap portions 61 and large lap portions 62 alternately aligned in a concavo-convex shape (wave shape). The overlapping flap 57 is provided with large lap portions 62, 62 positioned at the two ends, and is provided with a small lap portion 61 positioned above the handle 56.

Figure 4:
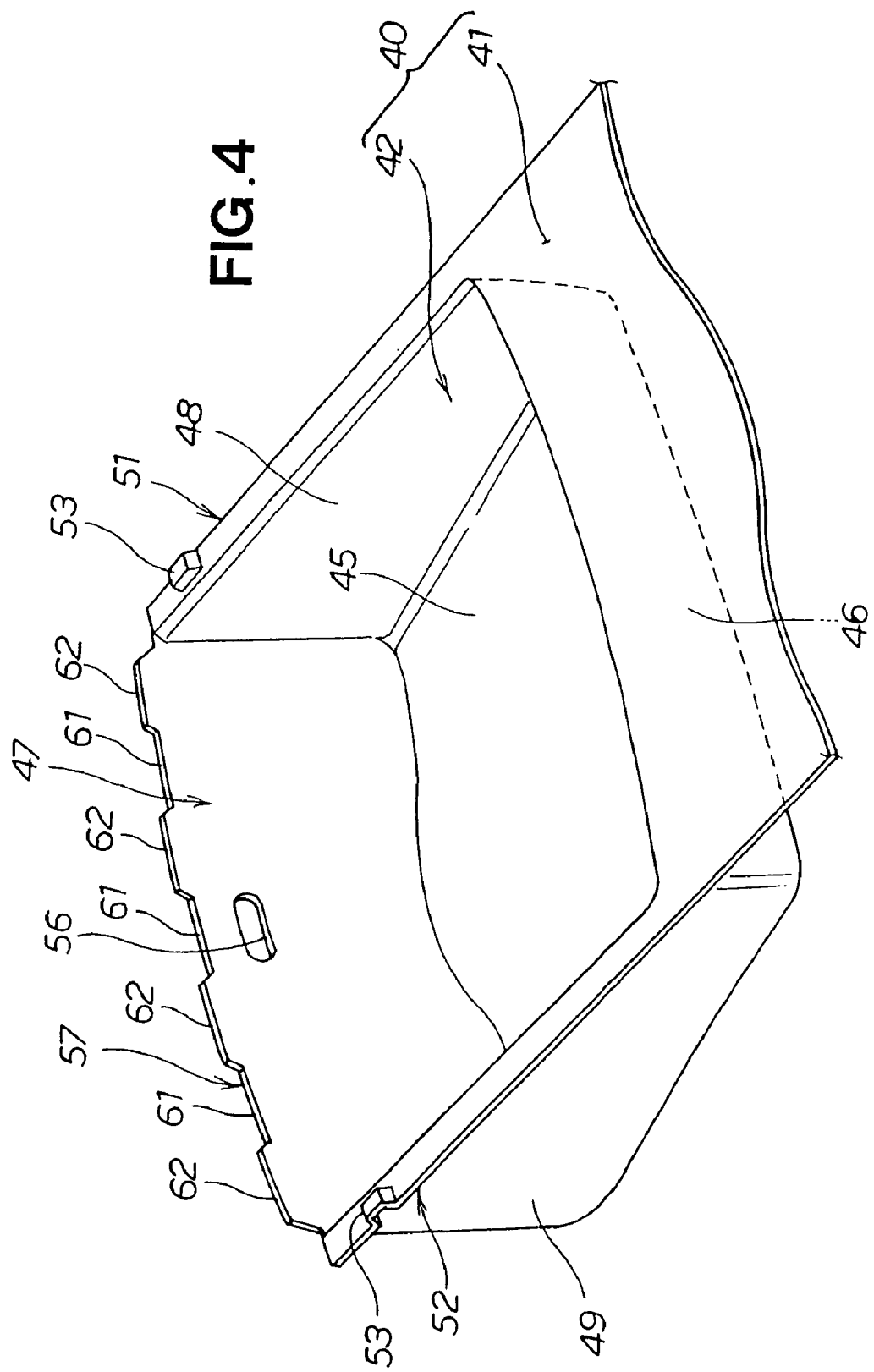
FIG. 4 is a perspective view of the floor carpet of FIG. 1.

The storage concavity 42 of the floor carpet 40 overlaps the rear surface 33 of the peripheral edge of the opening 32 when the opening 32 formed in the vehicle body 11 (FIG. 1) is closed, and has the overlapping flap 57 that can be pulled toward the surface of the opening 32 during opening, as seen in FIGS. 4 and 5.

Therefore, since the overlapping flap 57 has small lap portions 61 in which the overlapping surface area with the rear surface 33 of a peripheral edge of the opening 32 is small, and large lap portions 62 in which the overlapping surface area with the rear surface 33 of a peripheral edge of the opening 32 is large, the floor carpet 40 can be pulled out with greater ease when being open (pulled out), and a stable closed state can be maintained when the floor carpet 40 is closed.

In this way, the overlapping flap 57 merely overlaps the rear surface 33 of a peripheral edge of the opening 32, and the tool storage area 24 and the like can therefore be openably and closeably covered by the floor carpet 40 while avoiding an increase in the number of parts.

The overlapping flap 57 has a plurality of small lap portions 61 and large lap portions 62 alternately aligned in a concavo-convex shape, the operating load applied when the overlapping flap 57 is pulled out (opened) is reduced, and the overlapping flap 57 can be more easily returned to the stored (closed) position. Moreover, the operating load applied when pulling out the overlapping flap can be made uniform.

The floor carpet 40 is provided with a handle 56 for pulling out the carpet toward the interior of the passenger compartment 12 (see FIG. 1), and has a small lap portion 61 of the overlapping flap 57 above the handle 56. Therefore, the initial load applied when pulling out the floor carpet 40 can be reduced. As a result, the pull-out properties of the floor carpet 40 can be improved.

The overlapping flap 57 has large lap portions 62, 62 at the two sides, and the floor carpet 40 can therefore be better supported (made more stable) when closed.

The left and right flanges 51, 52 of the floor carpet 40 have convexities 53, 53, respectively, for engaging the vehicle body 11 (FIG. 1) in an area adjacent to the overlapping flap 57. For example, when the floor carpet 40 is disengaged in the area adjacent to the two sides of the overlapping flap 57, the floor carpet 40 becomes difficult to return to the closed position. In other words, the convexities 53, 53 for engaging the vehicle body 11 (more specifically, the flange retention sections 31, 31 of the wheelhouse linings 16, 16) are provided to an area adjacent to the two sides of the overlapping flap 57. Therefore, the floor carpet 40 can be prevented from becoming disengaged in the area adjacent to the two ends of the back end wall section 47. As a result, the floor carpet 40 can be opened and closed with greater ease.

Next, the manner in which the floor carpet 40 shown in FIG. 4 is used will be described with reference to FIGS. 6A through 6C.

Figure 6A:
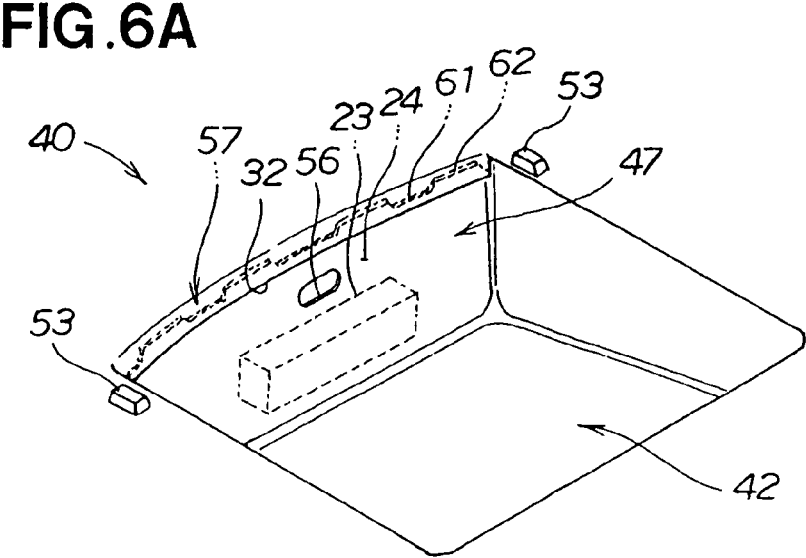
FIGS. 6A through 6C are views showing a manner in which the floor carpet of FIG. 4 is used.

In FIG. 6A, vehicle tools 23 are stored in a tool storage area 24 of the vehicle body 11 (FIG. 1). The overlapping flap 57 overlaps a rear surface 33 of a peripheral edge of the opening 32, as shown in FIG. 2. The vehicle tools 23 are covered by the floor carpet 40.

Figure 6B:
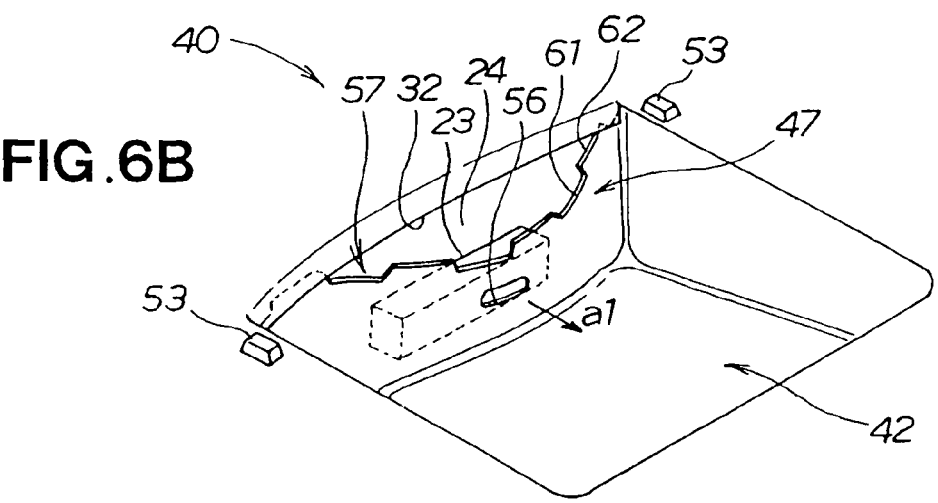

In FIG. 6B, the handle 56 formed on the back end wall section (open and close section) 47 of the storage concavity 42 is pulled forward (toward the front of the vehicle) as shown by arrow a1, and the overlapping flap 57 is disengaged from the rear surface 33 (FIG. 2) of a peripheral edge of the back end retention section (opening) 32 to open the back end wall section 47 of the storage concavity 42.

The overlapping flap 57 has small lap portions 61 and large lap portions 62 alternately aligned in a concavo-convex shape, and the operating load applied when the overlapping flap 57 is pulled out is therefore light. Furthermore, a small lap portion 61 of the overlapping flap 57 is provided above of the handle 56, and the initial load applied when the floor carpet 40 is pulled out is therefore reduced. Also, convexities 53, 53 for engaging the vehicle body 11 (FIG. 1) are provided in an area adjacent to the two ends of the overlapping flap 57, and the floor carpet 40 is therefore prevented from disengaging in the area adjacent to the two ends of the back end wall section (opening and closing section) 47.

Figure 6C:
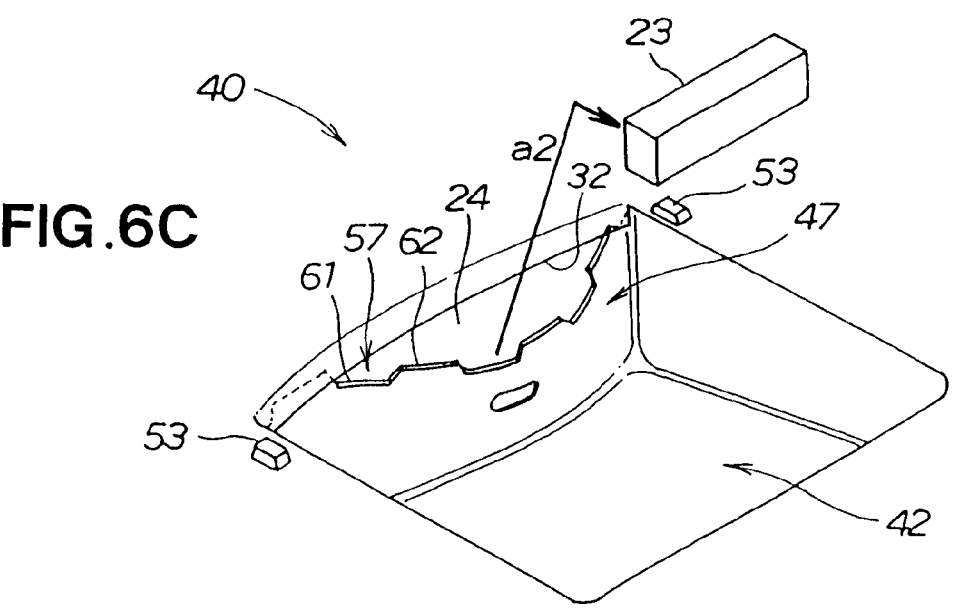

In FIG. 6C, the vehicle tools 23 can be taken from the tool storage area 24 as shown by arrow a2. After the vehicle tools 23 are used, the vehicle tools 23 are stored in the tool storage area 24, and the back end wall section (opening and closing section) 47 of the storage concavity 42 is closed. The small lap portions 61 and the large lap portions 62 of the overlapping flap 57 may be sequentially returned to the peripheral edge of the rear surface 33 (FIG. 2) of the opening 32, and the overlapping flap 57 can easily returned to the closed position (when closing the back end wall section 47).

The floor carpet 40 of this embodiment shows an example in which three small lap portions 61 of the overlapping flap 57 and four large lap portions 62 of the overlapping flap 57 were provided, as shown in FIG. 5, but the number of small lap portions and large lap portions is arbitrary.

INDUSTRIAL APPLICABILITY

The vehicle floor carpet of this invention can be advantageously used on sedans, wagons and other passenger vehicles.

The invention claimed is:

1. A vehicle floor carpet having an underlapping flap for overlapping a rear surface of a peripheral edge of an opening formed in a vehicle body when the opening is closed, the flap being capable of being pulled toward a front surface of the opening when the opening is opened, wherein the overlapping flap comprises:

a plurality of small lap portions having a small surface area for underlapping the rear surface of the peripheral edge of the opening; and a plurality of large lap portions having a large surface area for underlapping the rear surface of the peripheral edge of the opening.

2. The floor carpet of claim 1, wherein the small lap portions and the large lap portions are alternately arranged so as to form a wave shape.

3. The floor carpet of claim 1, wherein the floor carpet is provided with a handle for pulling out the carpet toward an interior of a passenger compartment, and the small lap portions are provided above the handle.

4. The floor carpet of claim 1, wherein the large lap portions are provided at opposite ends of the underlapping flap.

5. The floor carpet of claim 1, further comprising flanges which are provided with convexities, positioned closely to opposite ends of the underlapping flap, for engaging the vehicle body.

* * * * *